US012560337B2

(12) United States Patent
Heimerdinger et al.

(10) Patent No.: US 12,560,337 B2
(45) Date of Patent: Feb. 24, 2026

(54) OVER THE RANGE MICROWAVE OVEN WITH IMPROVED HOOD VENTILATION

(71) Applicant: Haier US Appliance Solutions, Inc., Wilmington, DE (US)

(72) Inventors: Mark Heimerdinger, Louisville, KY (US); Bagawathkumar Chellappan, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 407 days.

(21) Appl. No.: 18/321,123

(22) Filed: May 22, 2023

(65) Prior Publication Data

US 2024/0392974 A1 Nov. 28, 2024

(51) Int. Cl.
*F24C 15/20* (2006.01)
*H05B 6/64* (2006.01)

(52) U.S. Cl.
CPC ...... *F24C 15/2042* (2013.01); *F24C 15/2021* (2013.01); *F24C 15/2035* (2013.01); *H05B 6/6423* (2013.01)

(58) Field of Classification Search
CPC ..................................................... H05B 6/6423
See application file for complete search history.

(56) References Cited

U.S. PATENT DOCUMENTS 4,418,261 A * 11/1983 Jailor .................. F24C 15/2042 219/400
4,682,580 A * 7/1987 Fukumoto ............... F24C 15/20 126/299 D
6,239,419 B1 * 5/2001 Kim ..................... H05B 6/6429 219/757
6,242,725 B1 6/2001 Murata et al.
6,586,716 B1 * 7/2003 Lee ...................... H05B 6/6429 219/757
7,049,569 B2 * 5/2006 Kim ..................... H05B 6/6435 219/757
7,193,195 B2 3/2007 Lundstrom
2003/0047560 A1 * 3/2003 Yamauchi ............ H05B 6/6423 219/757
2004/0016751 A1 * 1/2004 Sung ...................... H05B 6/642 219/679
2005/0167425 A1 * 8/2005 Yamauchi ............ H05B 6/6423 219/757
2015/0305095 A1 * 10/2015 Huang ................. H05B 6/6423 219/757

FOREIGN PATENT DOCUMENTS

CN 206656405 U 11/2017
CN 111878864 A * 11/2020 .............. F24C 3/008
CN 215295058 U 12/2021
CN 113108345 B 5/2022
EP 1418386 B1 9/2006

(Continued)

*Primary Examiner* — Jorge A Pereiro
(74) *Attorney, Agent, or Firm* — Dority & Manning, P.A.

(57) ABSTRACT

An over the range (OTR) microwave appliance having a cabinet with improved ventilation includes ventilation ducts at the sides of the cabinet. The side ducts include drop down ducts that extend toward the range and each side duct may include a partition to facilitate optimized flow within the duct. Each side duct comprises an exhaust path from the open bottom end of the side duct to an exhaust.

18 Claims, 5 Drawing Sheets

(56) References Cited

FOREIGN PATENT DOCUMENTS

| | | | | | |
|---|---|---|---|---|---|
| KR | 200213186 | Y1 | | 2/2001 | |
| KR | 100551488 | B1 | | 2/2006 | |
| KR | 20100009886 | A | * | 1/2010 | .......... F24C 15/2092 |
| KR | 101450558 | B1 | | 10/2014 | |
| WO | WO2021020729 | A1 | | 2/2021 | |

* cited by examiner

OVER THE RANGE MICROWAVE OVEN WITH IMPROVED HOOD VENTILATION

FIELD OF THE INVENTION

The present disclosure relates generally to over the range kitchen appliances with a ventilation system. In particular, the disclosure relates to over the range microwave ovens with a ventilation system.

BACKGROUND OF THE INVENTION

Built-in kitchen appliances, for example microwave ovens, have become commonplace in household kitchens. In many applications, a microwave is built-in over a cooktop or range. Microwaves configured in this arrangement are generally referred to as over-the-range (OTR) appliances. In many cases, OTR microwave ovens include a ventilation system to capture and redirect steam, smoke, airborne grease, or odors generated at the range. Typical ventilation systems include an air intake opening located along a bottom surface of the OTR microwave. The ventilation system creates an air flow through a filter, into the intake opening, and either reintroduces the air into the room or directs it to an exhaust exit to the external atmosphere.

For greatest effectiveness, the ventilation system of the OTR microwave should draw intake air from an area that covers, or substantially covers, the cooktop of the range. Many OTR microwave ovens with ventilation have intake openings that are inwardly spaced from the perimeter of the microwave oven. Some of the steam, smoke, and odors produced at the cooktop of the range are not captured by the intake openings leading to consumer dissatisfaction.

Many OTR microwaves have a cooking chamber with a round turntable to support cooking utensils for rotation in the chamber. Cooking chambers generally are as wide as they are deep to accommodate the turntable. Overall width of the microwave is influenced by the size of the cooking chamber plus necessary structures and components. In many cases, the overall width of an OTR microwave with a ventilation system is less than the width of the range over which it is installed. Known OTR microwaves use spacers and trim to appear as wide as the range, with no increased ventilation coverage. Such configurations fail to capture some of the steam, smoke, and odors produced at the cooktop of the range, leading to consumer dissatisfaction.

Accordingly, an OTR microwave with increased ventilation coverage may be beneficial.

BRIEF DESCRIPTION OF THE INVENTION

Aspects and advantages of the invention will be set forth in part in the following description, may be apparent from the description, or may be learned through practice of the invention.

In one exemplary aspect, an over the range (OTR) microwave appliance is disclosed, the OTR microwave appliance comprises a cabinet having a front panel, a top panel, a back panel, a first external side panel laterally spaced from a second external side panel, and a microwave oven enclosure supported within the cabinet. The microwave oven enclosure comprises a first side wall laterally spaced from the first external side panel, the first side wall defining a first fan inlet; a second side wall laterally spaced from the second external side panel, the second side wall defining a second fan inlet; and a bottom panel joining the first side wall to the second side wall. The first side wall, the first external side panel, the front panel, the back panel, and the top panel define a first duct, and the second side wall, the second external side panel, the front panel, the back panel, and the top panel define a second duct. A first exhaust path is defined by the first duct and the first fan inlet, and a second exhaust path is defined by the second duct and the second fan inlet.

In another exemplary aspect, an OTR kitchen appliance comprises a cabinet having a front panel, a top panel, a back panel, a first external side panel laterally spaced from a second external side panel, and an appliance enclosure supported within the cabinet. The appliance enclosure comprises a first side wall laterally spaced from the first external side panel, the first external side panel, the first side wall, the top panel, the front panel, and the back panel defining a first duct. The appliance enclosure further comprises a second side wall laterally spaced from the second external side panel, the second external side panel, the second side wall, the top panel, the front panel, and the back panel defining a second duct, the first duct, the second duct, and an exhaust duct forming an exhaust air path. A bottom panel joins the first side wall to the second side wall and defines a cavity, the bottom panel defining a cooling air inlet. The OTR kitchen appliance further comprises a mechanical compartment within the cavity, the mechanical compartment is in fluid communication with the cooling air inlet and a cooling air outlet. The cooling air inlet, the mechanical compartment, and the cooling air outlet form a cooling air path and the exhaust air path flows to an exhaust vent and the cooling air path flows to a cooling air vent.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
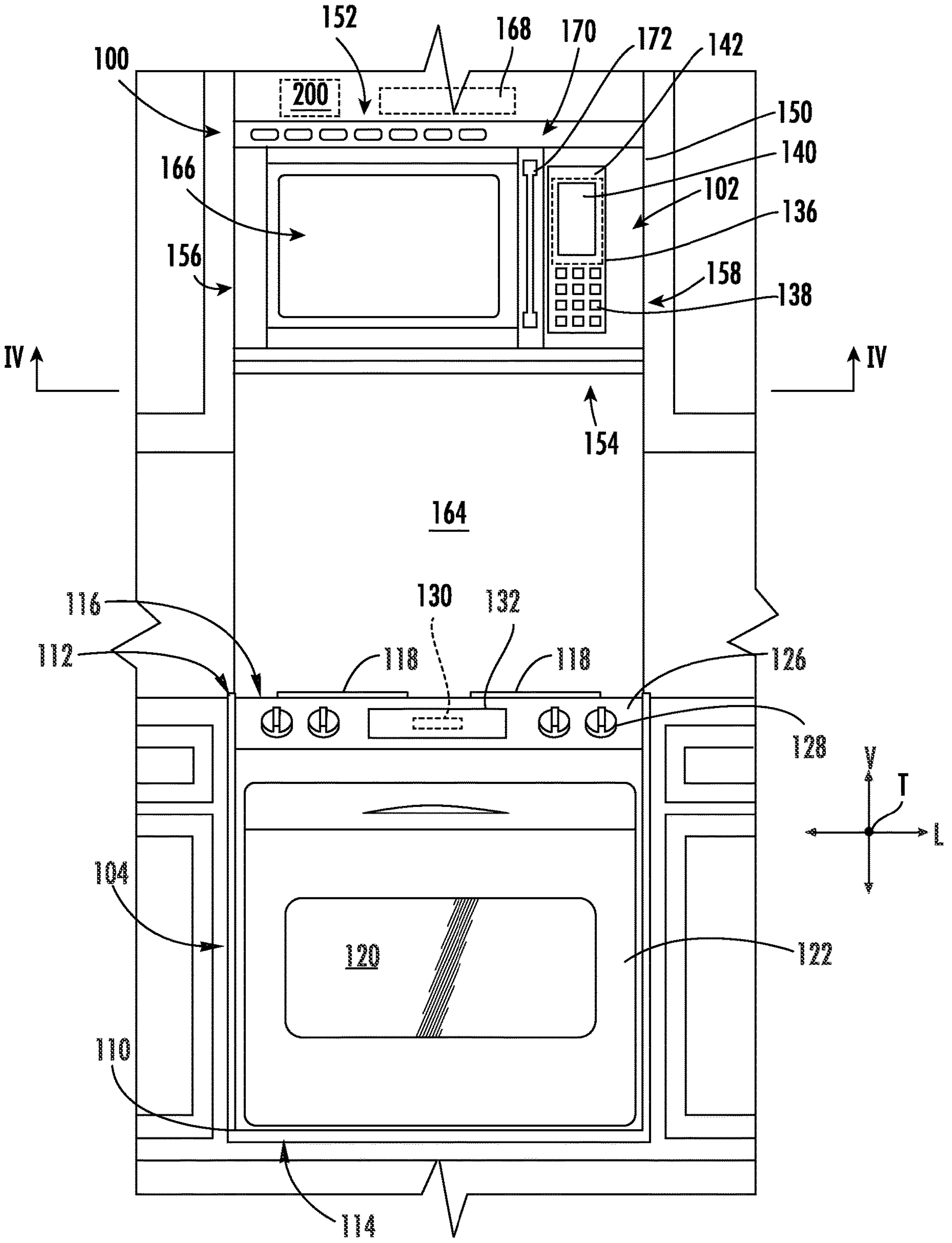
FIG. 1 provides a front view of a system, including an over the range microwave appliance, in accordance with an embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term “comprising.” Similarly, the term “or” is generally intended to be inclusive (i.e., “A or B” is intended to mean “A or B or both”). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms “a,” “an,” and “the” include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as “generally,” “about,” “approximately,” and “substantially,” are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., “generally vertical” includes forming an angle of up to ten degrees in any direction, e.g., clockwise or counterclockwise, with the vertical direction V.

The word “exemplary” is used herein to mean “serving as an example, instance, or illustration.” In addition, references to “an embodiment” or “one embodiment” does not necessarily refer to the same embodiment, although it may. Any implementation described herein as “exemplary” or “an embodiment” is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Embodiments of the present disclosure are referenced throughout this document with regard to an over the range (OTR) microwave with a ventilation system. The reference to a microwave is for illustration, not limitation. Any OTC appliance, for example a kitchen appliance, may be paired with a ventilation system to yield an over the range kitchen appliance in accordance with this disclosure. For example, a radiant heat oven, a combination cooking mode oven, or a communications or entertainment hub may be paired with a ventilation system without departing the scope of this disclosure.

Turning to the figures, FIG. 1 provides a front view of a system 100 according to exemplary embodiments of the present disclosure. System 100 generally includes an over-the-range (OTR) microwave appliance 102 that can be positioned or mounted above a cooktop appliance or range 104. Each of these appliances 102, 104 within system 100 will be described independently and collectively below. However, it should be appreciated that the present subject matter is not limited to the specific appliances disclosed, and the specific appliance configurations are not intended to limit the scope of the present subject matter in any manner.

As shown in FIG. 1, system 100 defines a vertical direction V, a lateral direction L, and a transverse direction T. The vertical, lateral, and transverse directions are mutually perpendicular and form an orthogonal direction system. As used herein, this coordinate system applies equally to both microwave appliance 102 and range 104 and will thus be used interchangeably to describe both appliances and their positions relative to each other.

Range 104 can include a chassis or cabinet 110 that extends along the vertical direction V between a top portion 112 and a bottom portion 114; along the lateral direction L between a left side portion and a right side portion; and along the traverse direction T between a front portion and a rear portion. Range 104 includes a cooktop surface 116 having one or more heating elements 118 (two shown) for use in, for example, heating or cooking operations. In exemplary embodiments, cooktop surface 116 is constructed with ceramic glass. In other embodiments, however, cooktop surface 116 may include another suitable material, such as a metallic material (e.g., steel) or another suitable non-metallic material. Heating elements 118 may be various sizes and may employ any suitable method for heating or cooking an object, such as a cooking utensil (not shown), and its contents. In some embodiments, for example, heating element 118 uses a heat transfer method, such as electric coils or gas burners, to heat the cooking utensil. In other embodiments, however, heating element 118 uses an induction heating method to heat the cooking utensil directly. In turn, heating element 118 may include a gas burner element, resistive heat element, radiant heat element, induction element, or another suitable heating element.

In some embodiments, range 104 includes an insulated cabinet 110 that defines a cooking chamber 120 selectively covered by a door 122. One or more heating elements (not shown, e.g., top broiling elements or bottom baking elements) may be enclosed within cabinet 110 to heat cooking chamber 120. Heating elements within cooking chamber 120 may be provided as any suitable element for cooking the contents of cooking chamber 120, such as an electric resistive heating element, a gas burner, a microwave element, a halogen element, etc. Thus, cooktop appliance 104 may be referred to as an oven range appliance. As will be understood by those skilled in the art, cooktop appliance or range 104 is provided by way of example only, and the present subject matter may be used in the context of any suitable cooking appliance, such as a double oven range appliance or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface panel 126 may be provided on range 104. Although shown at front portion of range 104, another suitable location or structure (e.g., a backsplash) for supporting user interface panel 126 may be provided in alternative embodiments. In some embodiments, user interface panel 126 includes input components or controls 128, such as one or more of a variety of electrical, mechanical, or electro-mechanical input devices. Controls 128 may include, for example, rotary dials, knobs, push buttons, and touch pads. A controller 130 is in communication with user interface panel 126 and controls 128 through which a user may select various operational features and modes and monitor progress of range 104. In additional or alternative embodiments, user interface panel 126 includes a display component 132, such as a digital or analog display in communication with a controller 130 and configured to provide operational feedback to a user. In certain embodiments, user interface panel 126 represents a general purpose I/O ("GPIO") device or functional block.

As shown, controller 130 is communicatively coupled (i.e., in operative communication) with user interface panel 126, controls 128, and display 132. Controller 130 may also be communicatively coupled with various operational components of range 104 as well, such as heating elements (e.g., 118), sensors, etc. Input/output ("I/O") signals may be routed between controller 130 and the various operational components of range 104. Thus, controller 130 can selectively activate and operate these various components. Various components of range 104 are communicatively coupled with controller 130 via one or more communication lines such as, for example, conductive signal lines, shared communication busses, or wireless communications bands.

In some embodiments, controller 130 includes one or more memory devices and one or more processors. The processors can be any combination of general or special purpose processors, CPUs, or the like that can execute programming instructions or control code associated with operation of range 104. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 130 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 130 includes a network interface such that controller 130 can connect to and communicate over one or more networks with one or more network nodes. Controller 130 may also include one or more transmitting, receiving, or transceiving components for transmitting/receiving communications with other devices communicatively coupled with range 104. Additionally, or alternatively, one or more transmitting, receiving, or transceiving components can be located off board controller 130. Generally, controller 130 can be positioned in any suitable location throughout range 104. For example, controller 130 may be located proximate to user interface panel 126 toward front portion of range 104. In optional embodiments, controller 130 is in operable communication with a controller 130 (described below) of microwave appliance 102 (e.g., through one or more wired or wireless channels).

Referring still to FIG. 1, OTR microwave appliance 102 may include a control panel 136 that may represent a general-purpose Input/Output ("GPIO") device or functional block for microwave appliance 102. In some embodiments, control panel 136 may include or be in operative communication with one or more user input devices 138, such as one or more of a variety of digital, analog, electrical, mechanical, or electro-mechanical input devices including rotary dials, control knobs, push buttons, toggle switches, selector switches, and touch pads. Additionally, microwave appliance 102 may include a display 140, such as a digital or analog display device generally configured to provide visual feedback regarding the operation of microwave appliance 102. For example, display 140 may be provided on control panel 136 and may include one or more status lights, screens, or visible indicators. According to exemplary embodiments, user input devices 138 and display 140 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Microwave appliance 102 may further include or be in operative communication with a processing device or a controller 142 that may be generally configured to facilitate appliance operation. In this regard, control panel 136, user input devices 138, and display 140 may be in communication with controller 142 such that controller 142 may receive control inputs from user input devices 138, may display information using display 140, and may otherwise regulate operation of microwave appliance 102. For example, signals generated by controller 142 may operate microwave appliance 102, including any or all system components, subsystems, or interconnected devices, in response to the position of user input devices 138 and other control commands. Control panel 136 and other components of microwave appliance 102 may be in communication with controller 142 via, for example, one or more signal lines or shared communication busses. In this manner, Input/Output ("I/O") signals may be routed between controller 142 and various operational components of microwave appliance 102.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 142 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 142 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 142 may be operable to execute programming instructions or micro-control code associated with an operating cycle of appliance 102. In this regard, the instructions may be software or any set of instructions that when executed by the processing device, cause the processing device to perform operations, such as running one or more software applications, displaying a user interface, receiving user input, processing user input, etc. Moreover, it should be noted that controller 142 as disclosed herein is capable of and may be operable to perform any methods, method steps, or portions of methods as disclosed herein. For example, in some embodiments, methods disclosed herein may be embodied in programming instructions stored in the memory and executed by controller 142.

The memory devices may also store data that can be retrieved, manipulated, created, or stored by the one or more processors or portions of controller 142. The data can include, for instance, data to facilitate performance of methods described herein. The data can be stored locally (e.g., on controller 142) in one or more databases and/or may be split up so that the data is stored in multiple locations. In addition, or alternatively, the one or more database(s) can be connected to controller 142 through any suitable network(s), such as through a high bandwidth local area network (LAN) or wide area network (WAN). In this regard, for example, controller 142 may further include a communication module or interface that may be used to communicate with one or more other component(s) of microwave appliance 102, controller 142, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

As noted above, microwave appliance 102 may be positioned or mounted above range 104 (e.g., as an OTR microwave). Specifically, a cabinet 150 of OTR microwave appliance 102 may be positioned above range 104 along the vertical direction V.

Figure 3:
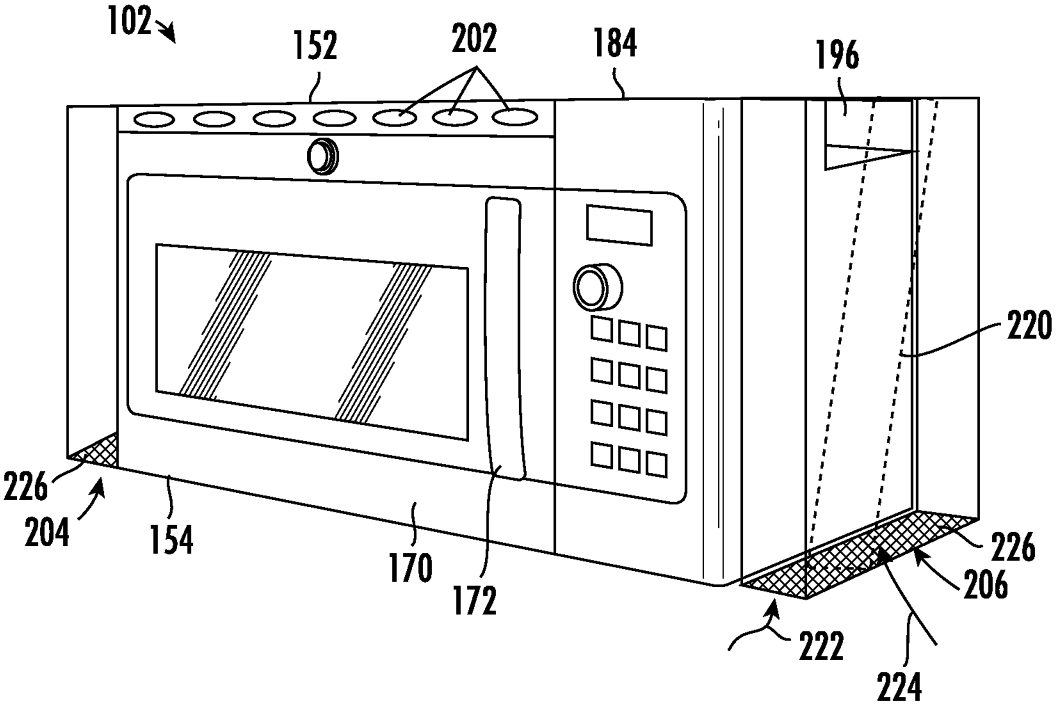
FIG. 3 is a perspective view of an over the range microwave with ventilation in accordance with the present disclosure.

In embodiments, the cabinet 150 may be an insulated cabinet. As shown, cabinet 150 of microwave appliance 102 includes a plurality of outer walls and when assembled, microwave appliance 102 generally extends along the vertical direction V between a top end 152 and a bottom end 154; along the lateral direction L between a first side end 156 and a second side end 158; and along the transverse direction T between a front end and a rear end. In particular, cabinet 150 comprises first exterior side panel 176 at first side 156 laterally spaced from second external side panel 178 at second side 158, a front panel 180, a back panel 182, and a top panel 184 (FIG. 3).

In some embodiments, cabinet 150 is spaced apart from cooktop surface 116 along the vertical direction V. An open region 164 may thus be defined along the vertical direction V between cooktop surface 116 and bottom end 154 of cabinet 150. Although a generally rectangular shape is illustrated, any suitable shape or style may be adapted to form the structure of cabinet 150. Within cabinet 150, an internal liner of cabinet 150 defines a cooking chamber 166 for receipt of food items for cooking.

A microwave oven enclosure 162 may be supported within the cabinet 150. The microwave oven enclosure 162 comprises a first side wall 190 laterally spaced from the first external side panel 176. The first side wall 190 defines a first fan inlet 192 formed as an opening in the first side wall 190. As illustrated, the first fan inlet 192 may be formed by removing a portion of the first side wall 190. In other embodiments, the first fan inlet 192 may be a series of smaller openings, for example holes or slots, formed in the first side wall 190 to allow a flow of air to pass.

The microwave oven enclosure 162 comprises a second side wall 194 laterally spaced from the second external side panel 178. The second side wall 194 also defines a fan inlet, second fan inlet 196 formed, as above, as an opening in the second side wall 194. Also as above, the second fan inlet 196 may be formed by removing a portion of the second side wall 194 or, in some embodiments, may be a series of smaller openings, for example holes or slots, formed in the second side wall 194 to allow a flow of air to pass. The microwave oven enclosure 162 may also comprise a bottom panel 198 joining the first side wall 190 and the second side wall 194 at a lower end of each wall.

Microwave appliance 102 is generally configured to heat articles (e.g., food or beverages) within cooking chamber 166 using electromagnetic radiation. Microwave appliance 102 may include various components which operate to produce the electromagnetic radiation, as is generally understood. For example, microwave appliance 102 may include a heating assembly 168 in mechanical space 200, the heating assembly 168 having a magnetron (e.g., a cavity magnetron), a high voltage transformer, a high voltage capacitor, and a high voltage diode, as is understood. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 166.

The structure and intended function of microwave ovens or appliances are generally understood by those of ordinary skill in the art and are not described in further detail herein.

Microwave appliance 102 includes a door assembly 170 that is movably mounted (e.g., rotatably attached) to cabinet 150 in order to permit selective access to cooking chamber 166. Specifically, door assembly 170 can move between an open position (not pictured) and a closed position (e.g., FIG. 1). The open position permits access to cooking chamber 166 while the closed position restricts access to cooking chamber 166. The handle 172 may be mounted to or formed on door assembly 170 to assist a user with opening and closing door assembly 170.

Figure 2:
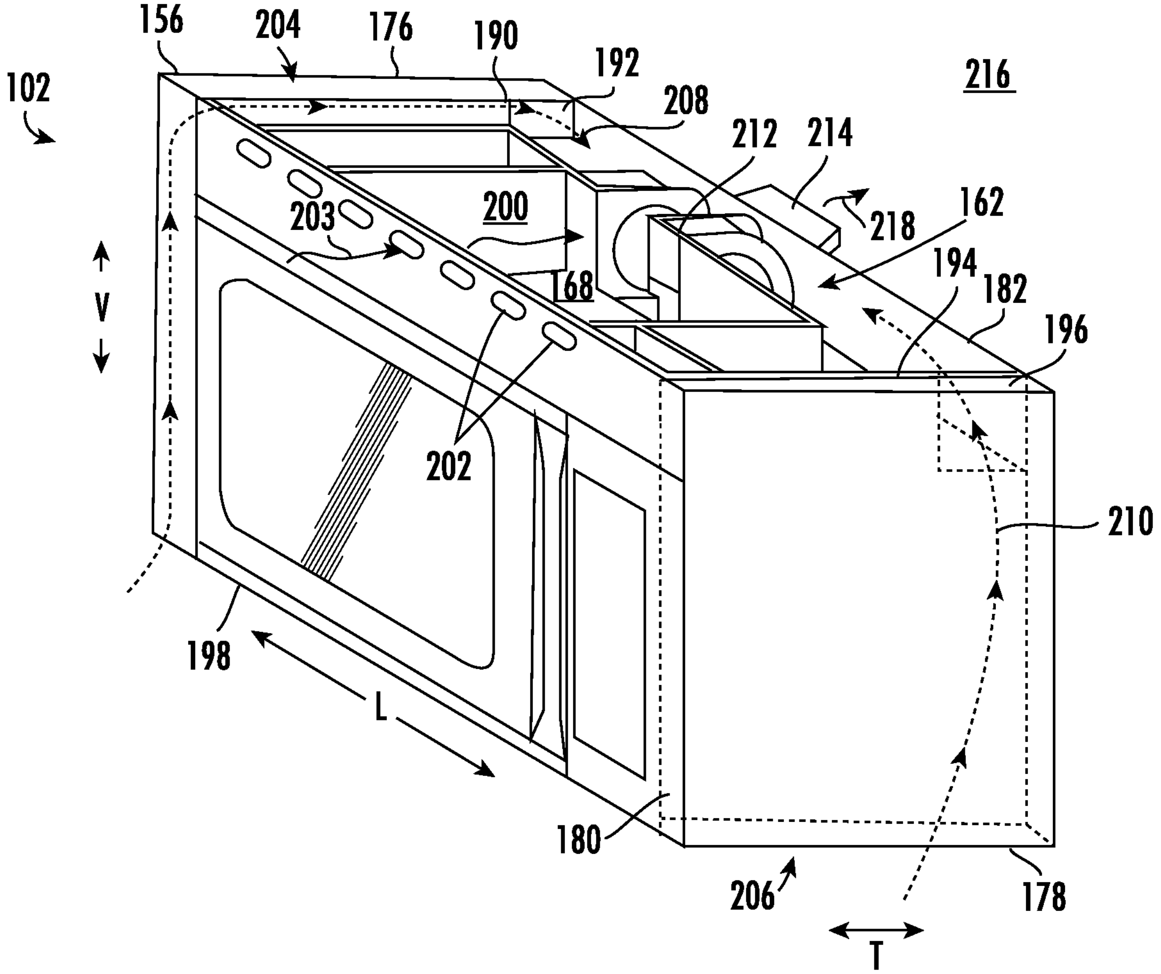
FIG. 2 is a partially exploded perspective view of an over the range microwave with ventilation in accordance with the present disclosure.

As described above and illustrated at least in FIGS. 2 and 3, the first side wall 190, the first external side panel 176, the front panel 180, the back panel 182, and the top panel 184 define a first duct 204. Similarly, the second side wall 194, the second external side panel 178, the front panel 180, the back panel 182, and the top panel 184 define a second duct 206. Ducts 204, 206 are open at the bottom 154 of the cabinet 150 and closed at the upper end by top panel 184. First fan inlet 192 provides an outlet to first duct 204 and together, first duct 204 and first fan inlet 192 define a first exhaust path 208 (FIG. 2). Similarly, second fan inlet 196 provides an outlet to second duct 206, and second duct 206 and second fan inlet 196 cooperate to define a second exhaust path 210 (FIG. 2).

As illustrated in FIG. 3, first and second ducts 204, 206 may include filter elements 226 to trap smoke, odors, or airborne grease given off at the cooktop 116 of the range 104 or from the cooking chamber 120. Filter elements 226 may be any material or construction suitable to withstand cooking temperatures and trap odors or particulates drawn into the ducts 204, 206. For example, filter elements 226 may be metallic mesh or woven fiberglass filters and may include activated charcoal to absorb or neutralize cooking odors.

First exhaust path 208 and second exhaust path 210 may be in fluid communication with fan 212 mounted in the cabinet 150. As illustrated, fan 212 is positioned adjacent to the back panel 182 of the cabinet 150. The location of the fan 212 may be any suitable location facilitating a flow of air through the first and second exhaust paths 208, 210. In an embodiment, the fan 212 draws air in from the first duct 204 and the second duct 206 forming first and second exhaust paths 208, 210, respectively. The exhaust paths 208, 210 may be combined at the fan 212 to form exhaust 218 which, in an embodiment, flows through an exhaust vent 214 to the external atmosphere 216. Accordingly, the combined exhaust 218 includes first and second ducts 204, 206, first and second fan inlets 192, 196, fan 212, and the exhaust vent 214.

In the exemplary embodiment of FIG. 3, the second duct 206 includes a partition 220 disposed in the interior of second duct 206, bifurcating the internal volume. The partition extends at an acute angle to the lateral (L)-transverse (T) plane and extends from the bottom 154 of cabinet 150 to the top panel 184. As illustrated, the partition 220 also bifurcates the second fan inlet 196. Thus, the partition creates two flow paths 222, 224 through second duct 206. By altering the position of the partition 220 within the second duct 206, the flow characteristics of flow paths 222, 224 can be modified. For example, the volumetric flow rate at the bottom 154 of the second duct 206 may be increased or decreased by adjusting the position of the partition 220 at the bottom 154 of the cabinet 150 and adjusting the upper end of the partition at the second fan inlet 196. The partition 220 is shown in second duct 206 for ease of illustration only. The partition may be in first duct 204, second duct 206, or in both first and second ducts 204, 206 in other embodiments.

Figure 4:
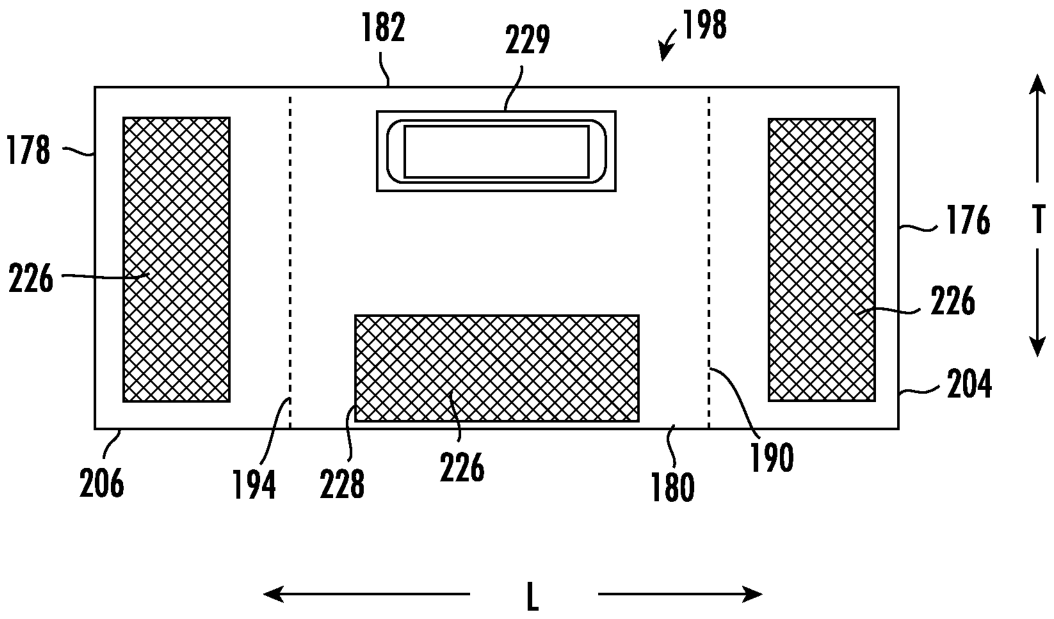
FIG. 4 is a bottom view of the over the range microwave appliance of FIG. 1 taken along line IV-IV.

An exemplary embodiment of bottom panel 198 of microwave oven enclosure 162 is presented in FIG. 4, which is a bottom view taken along IV-IV of FIG. 1. As illustrated, bottom panel 198 is bounded by front panel 180, back panel 182, first duct 204 and second duct 206. According to embodiments of the present disclosure, the bottom panel 198 may define an exhaust air inlet 228 fluidly coupled to an exhaust path, for example the exhaust 218, through fan 212 (FIG. 2). Exhaust air inlet 228 may be generally planar with the bottom panel 198 and draw steam, smoke and odors from the cooktop surface 116. As with ducts 204, 206, exhaust air inlet 228 may include a filter element 226 to trap airborne particles or odors emanating from the cooktop 116.

According to some embodiments, bottom panel 198 includes a lighting device 229 to provide illumination of the cooktop surface 116. Lighting device 229 may include one or more light sources, for example halogen bulbs, light emitting diodes (LEDs), or incandescent bulbs.

Figure 5:
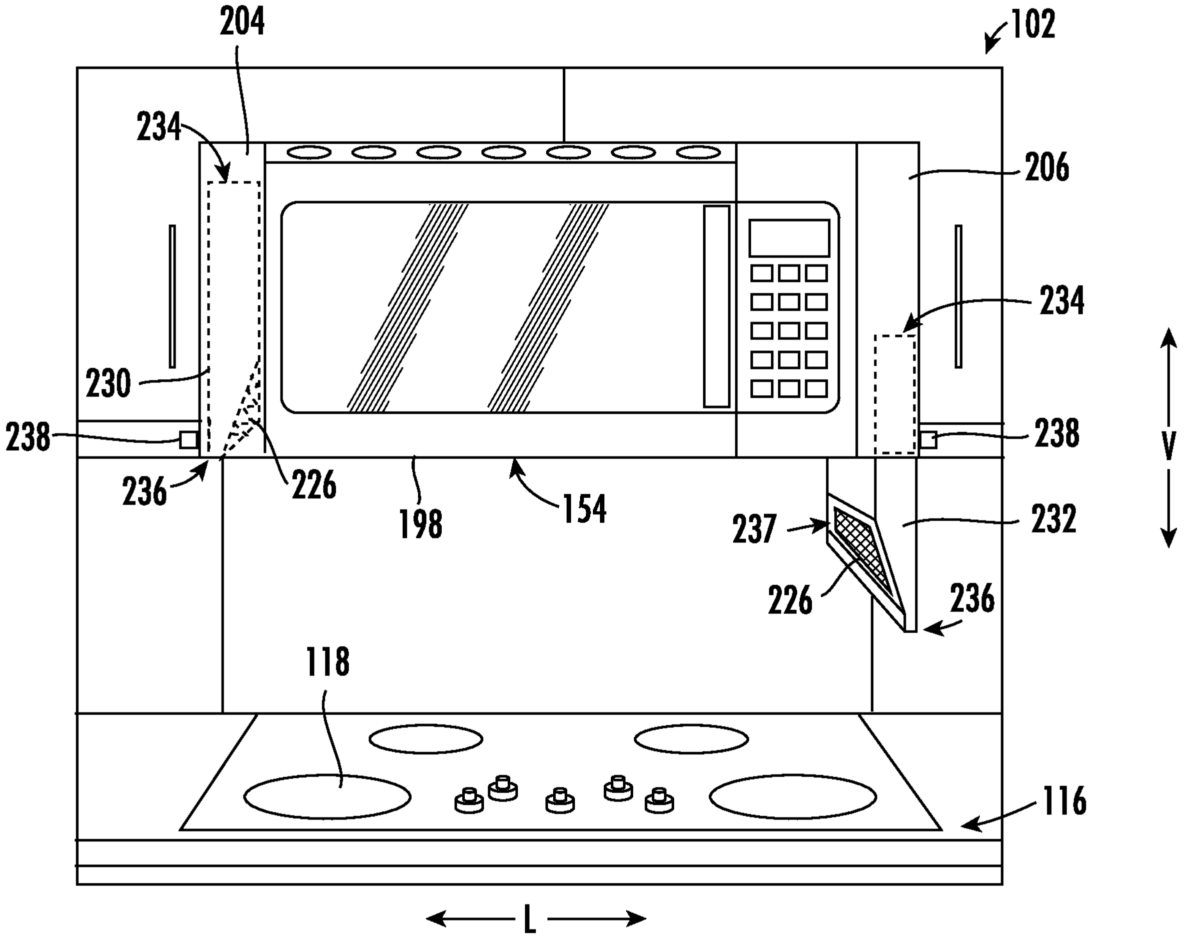
FIG. 5 is a front view of an over the range microwave appliance in accordance with an embodiment of the present disclosure.

As illustrated for example in FIG. 5, embodiments of the present disclosure may include first drop down side duct 230 and second drop down side duct 232 received in first and second ducts 204, 206, respectively. Drop down side ducts 230, 232 include an open upper end 234 and an open lower end 236 and are supported for displacement, i.e., vertical displacement, between a first, retracted position and a second extended position. FIG. 5 illustrates exemplary first drop down side duct 230 in a retracted position in which all, or substantially all, of first drop down side duct 230 is within the first duct 204. In the exemplary retracted position of FIG. 5, the open lower end 236 of first dropdown side duct 230 is substantially coplanar with the bottom 154 of cabinet 150. The exemplary embodiment of FIG. 5 also illustrates second drop down side duct 232 in a partially extend position. In the partially extended position illustrated, upper end 234 of second drop down side duct 232 is within second duct 206 and the lower end 236 is extended vertically below the bottom panel 198, i.e., vertically downward towards cooktop surface 116.

First drop down side duct 230 and second drop down side duct 232 are in fluid communication with first and second ducts 204, 206, respectively. Accordingly, the first drop down side duct 230 is included in the first exhaust path 208 and the second drop down side duct 232 is included in the second exhaust path 210. At the fan 212, the first and second exhaust paths 208, 210 form exhaust 218.

FIG. 5 illustrates first drop down side duct 230 in a retracted position and second drop down side duct 232 in a partially extend position for ease of illustration only. The drop down side ducts 230, 232 are independent of each other, so one may be extended when the other retracted, both may be retracted, or both may be extended. To facilitate maintaining a side duct in a desired vertical displacement, a latch 238 may be provided to secure the drop down side ducts 230, 232 in a selected vertical position. Latch 238 is illustrated schematically on first and second drop down side ducts 230, 232. The latch 238 may be a mechanical latch that engages a portion of the drop down side duct and fixes it against unintended vertical displacement. For example, a spring-loaded push button may cooperate with one of more vertically aligned holes to selectively position a drop down side duct 230, 232 within a duct 204, 206. In other embodiments, positioning rails, for example a rack and pinion arrangement, may be used to selectively position a drop down side duct in a duct. Other latching mechanisms may be used, for example friction or magnetic elements, to selectively position the drop downside ducts 230, 232 with respect to the ducts 204, 206.

As illustrated in the exemplary embodiment of FIG. 4, lower open end 236 of first and second drop downside ducts 230, 232 may be configured such that the open portion 237 forms an acute angle with the vertical direction V. In this configuration, the open portion 237 is directed toward the central area of the cooktop surface 116 and may contain steam, smoke, and odors emanating from the cooktop surface 116. In other embodiments, the open portion 237 is perpendicular to the vertical direction V, i.e., generally parallel to the cooktop surface 116.

As illustrated in FIG. 4, exemplary embodiments of drop down side ducts 230, 232 may include filter elements 226 at the open lower end 236. As above, the filter elements may be any material or construction suitable to withstand cooking temperatures and trap odors or particulates drawn into the ducts 204, 206. For example, filter elements 226 may be metallic mesh or woven fiberglass filters and may include activated charcoal to absorb or neutralize cooking odors.

As described above, mechanical compartment 200 includes the heating assembly 168 for microwave appliance 102. As generally known, certain components in a microwave heating assembly, for example the magnetron, generate excessive heat during operation. According to the present disclosure removal of the excessive heat may be achieved, for example, by providing a cooling air flow path 203 through the microwave oven enclosure 162. Cooling air flow path 203 may include cooling air inlets 202 defined by a portion of the cabinet 150, for example, front panel 180. A fan, for example fan 212, may draw air in through the air inlets 202 and through the mechanical compartment 200 of microwave oven enclosure 162 and then to an exhaust, for example exhaust vent 214. In similar fashion, a separate fan may be provided to urge a cooling air flow path that remains separate from the first and second exhaust paths 208, 210.

Reference to a microwave throughout this disclosure is for purposes of illustration and not to limit the scope of the disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An over the range kitchen appliance defining a vertical direction, a lateral direction, and a transverse direction, the over the range kitchen appliance comprising:

- a cabinet having a front panel, a top panel, a back panel, a first external side panel laterally spaced from a second external side panel;
- an appliance enclosure supported within the cabinet, the appliance enclosure comprising:
  - a first side wall laterally spaced from the first external side panel, the first external side panel, the first side wall, the top panel, the front panel, and the back panel defining a first duct, and a second side wall laterally spaced from the second external side panel, the second external side panel, the second side wall, the top panel, the front panel, and the back panel defining a second duct, the first duct, the second duct, and an exhaust duct forming an exhaust air path;
  - a bottom panel joining the first side wall to the second side wall and defining a cavity, the bottom panel defining a cooling air inlet;
  - a mechanical compartment within the cavity, the mechanical compartment in fluid communication with the cooling air inlet and a cooling air outlet, the cooling air inlet, the mechanical compartment, and the cooling air outlet forming a cooling air path;
- wherein, the exhaust air path flows to an exhaust vent and the cooling air path flows to a cooling air vent;
- a partition in the first duct bifurcating the first duct and the first fan inlet; and
- a partition in the second duct bifurcating the second duct and the second fan inlet.

2. The over the range kitchen appliance of claim 1, further comprising:

- a first drop-down side duct having an open upper end and an open lower end;
- a second drop-down side duct having an open upper end and an open lower end;
- wherein the first drop-down side duct is received within the first duct for selectable vertical displacement between a retracted position and an extended position; and
- wherein the second drop-down side duct is received within the second duct for selectable vertical displacement between a retracted position and an extended position.

3. An over the range microwave appliance defining a vertical direction, a lateral direction, and a transverse direction, the over the range microwave comprising:

- a cabinet having a front panel, a top panel, a back panel, a first external side panel laterally spaced from a second external side panel;
- a microwave oven enclosure supported within the cabinet, the microwave oven enclosure comprising:
  - a first side wall laterally spaced from the first external side panel, the first side wall defining a first fan inlet;
  - a second side wall laterally spaced from the second external side panel, the second side wall defining a second fan inlet;
  - a bottom panel joining the first side wall to the second side wall;
- wherein:
- the first side wall, the first external side panel, the front panel, the back panel, and the top panel define a first duct;
- the second side wall, the second external side panel, the front panel, the back panel, and the top panel define a second duct;
- a first exhaust path defined by the first duct and the first fan inlet, and a second exhaust path defined by the second duct and the second fan inlet;
- a partition in the first duct bifurcating the first duct and the first fan inlet; and
- a partition in the second duct bifurcating the second duct and the second fan inlet.

4. The over the range microwave appliance of claim 3, further comprising:

- a first drop-down side duct having an open upper end and an open lower end, wherein the first drop-down side duct is received within the first duct for selectable vertical displacement between a retracted position and an extended position; and
- a second drop-down side duct having an open upper end and an open lower end, wherein the second drop-down side duct is received within the second duct for selectable vertical displacement between a retracted position and an extended position.

5. The over the range microwave appliance of claim 4, wherein in the retracted position:

- the first drop-down side duct is substantially within the first duct; and
- the second drop-down side duct is substantially within the second duct.

6. The over the range microwave appliance of claim 5, wherein in the extended position:

- the lower end of the first drop-down side duct is vertically below the bottom panel; and
- the lower end of the second drop-down side duct is vertically below the bottom panel.

7. The over the range microwave appliance of claim 6, wherein a plane of the open lower end of the first duct and a plane of the open lower end of the second duct are generally perpendicular to the vertical direction.

8. The over the range microwave appliance of claim 4, further comprising a first filter element at a lower end of the first drop-down side duct and a second filter element at a lower end of the second drop-down side duct.

9. The over the range microwave appliance of claim 4, further comprising a first latch to selectively position the first drop-down side duct vertically between the retracted position and the extended position and a second latch to selectively position the second drop-down side duct vertically between the retracted position and the extended position.

10. The over the range microwave appliance of claim 9, wherein the first latch is one of a friction positioning device and a mechanical positioning device and the second latch is one of a friction positioning device and a mechanical latch.

11. The over the range microwave appliance of claim 4, wherein the first exhaust path further comprises the first drop-down side duct and second exhaust path comprises the second drop-down side duct.

12. The over the range microwave appliance of claim 4, further comprising a fan disposed in the cabinet in fluid communication with the first duct and the second duct, wherein the first exhaust path and the second exhaust path combine at the fan forming an exhaust.

13. The over the range microwave appliance of claim 12, further comprising a first exhaust vent in fluid communication with the fan, the exhaust comprising the first exhaust vent.

14. The over the range microwave appliance of claim 13, wherein the first exhaust vent discharges the exhaust to an external atmosphere.

15. The over the range microwave appliance of claim 3, further comprising a filter element in the first duct and a filter element in the second duct.

16. The over the range microwave appliance of claim 3, wherein the bottom panel defines an exhaust air inlet fluidly coupled to the exhaust path.

17. The over the range microwave appliance of claim 3, wherein the microwave oven enclosure includes a cooling air inlet, a cooling air flow path, and a cooling air exit, the cooling air flow path including a mechanical compartment.

18. The over the range microwave appliance of claim 17, further comprising an oven cavity within the microwave oven enclosure, wherein the cooling air flow path includes the oven cavity.

* * * * *